July 5, 1927.
H. G. SMITH
1,634,694
AUXILIARY HEADLIGHT
Filed July 21, 1926
2 Sheets-Sheet 1
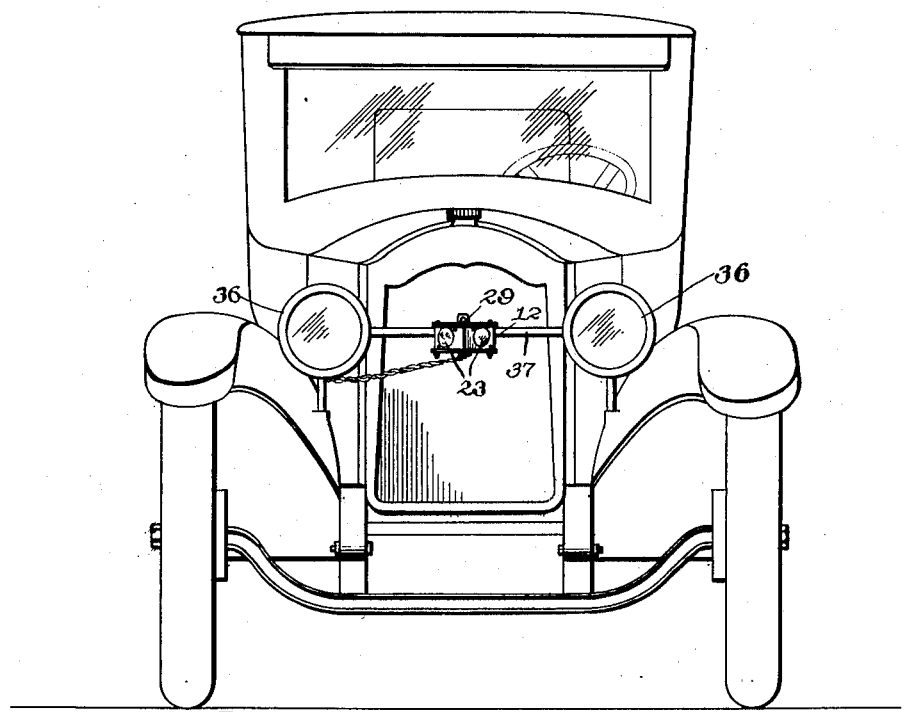
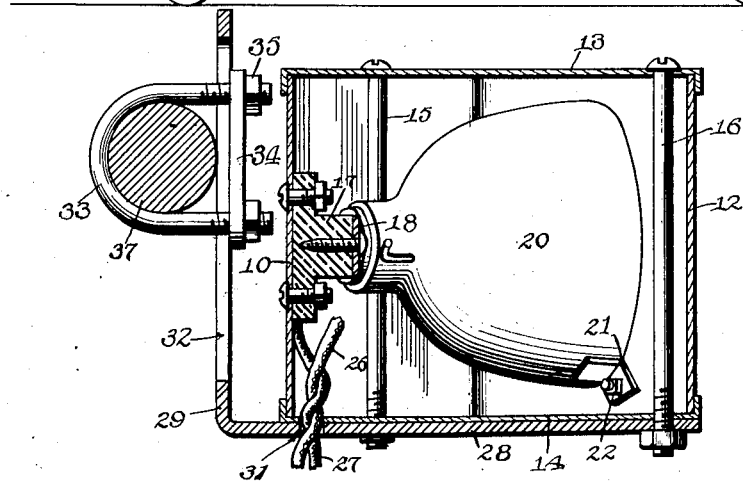
H. G. Smith, Inventor
By Lacey & Lacey, Attorneys July 5, 1927.
H. G. SMITH
AUXILIARY HEADLIGHT
Filed July 21, 1926
1,634,694
2 Sheets-Sheet 2
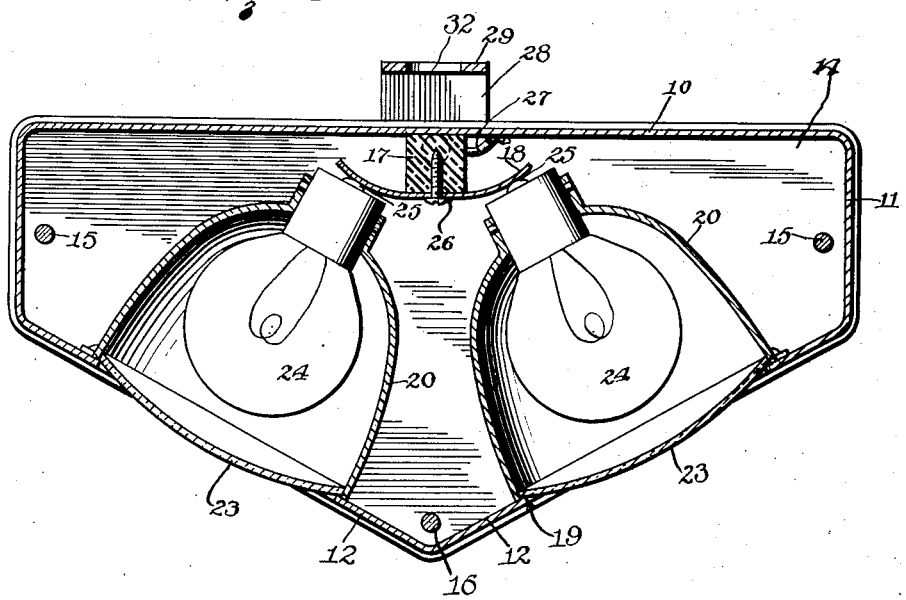
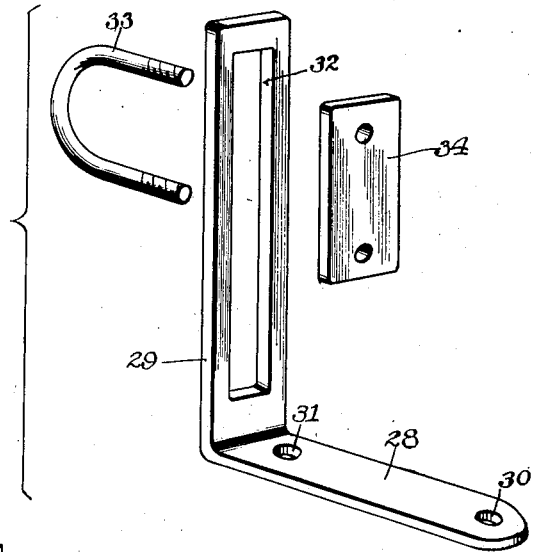
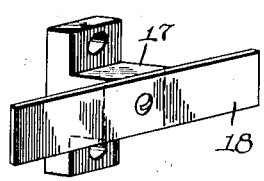
H. G. Smith, Inventor
By Lacey & Lacey, Attorneys Patented July 5, 1927.

1,634,694

UNITED STATES PATENT OFFICE.

HARVEY G. SMITH, OF SALINA, KANSAS.

AUXILIARY HEADLIGHT.

Application filed July 21, 1926. Serial No. 124,029.

This invention relates to an improved auxiliary headlight for motor vehicles and seeks, among other objects, to provide a device which, without proving obnoxious to other motorists, will enable a driver to steer at night with safety and will thus tend to minimize collisions as well as minimize the wrecking of vehicles by running off the roadway.

A further object of the invention is to provide an auxiliary headlight which will illuminate the margins or shoulders of a roadway so that, when meeting an oncoming motorist with dazzling headlights, the driver may avoid running into the ditch.

Another object of the invention is to provide an auxiliary headlight which will facilitate steering when turning corners or driving into entrances to residences or the like.

And the invention seeks, as a still further object, to provide a device which will be characterized by structural simplicity, which may be readily installed, and wherein provision will be made for adjusting the headlights and tilting the beams of the lamps to satisfy the requirements of the user.

Other objects of the invention not specifically mentioned in the foregoing will appear during the course of the following description.

In the accompanying drawings:

Figure 1 is a front elevation showing my improved auxiliary headlight mounted upon a conventional motor vehicle.

Figure 2 is a sectional view taken from front to rear of the headlight and more particularly showing how the device is applied.

Figure 3 is a horizontal sectional view through the device.

Figure 4 is a detail perspective view particularly showing the supporting bracket employed.

Figure 5 is a detail perspective view particularly showing the contact spring and supporting block therefor.

Referring now more particularly to the drawings, I employ a substantially triangular-shaped casing including a shell having a back wall 10, end walls 11, and angularly disposed front walls 12. Removably fitting over the shell are top and bottom plates 13 and 14, and extending through said plates within the shell are tie bolts 15 located near the ends of the shell, and a similar tie bolt 16 located near the apex of the front walls 12. Preferably, the casing is constructed of suitable sheet metal.

Bolted to the back wall of the casing medially thereof is an insulating block 17, and secured at a point midway between its ends to said block is a spring contact 18 projecting at opposite sides of the block. Formed in the front walls 12 of the shell are openings 19, and abutting said walls at their inner sides to surround said openings are angularly disposed reflectors 20. As brought out in Figure 2, these reflectors are provided with ears 21 which receive bolts 22 detachably securing the reflectors to the front walls of the shell, and frictionally fitting in the forward ends of the reflectors are lenses 23 accommodated by the openings 19 in said front walls and tightly clamped between the front walls and said reflectors. Since the reflectors are more or less bell-shaped, tightening of the bolts 22 will serve to wedge the lenses within the forward ends of the reflectors and tightly bind the lenses between the walls of the reflectors and the margins surrounding the openings 19. At their smaller ends, the reflectors are provided with sleeves and removably secured in said sleeve are suitable lamps 24, the terminals 25 of which are engaged by the end portions of the spring contact 18. As will be observed, the spring contact is flexed longitudinally so that said contact is constantly held under tension to maintain efficient electrical connection between said contact and the terminals of the lamps as well as hold the lamps against rattling. Connected with the contact by its securing screw is a wire 26, and connected with the casing is a return wire 27. Thus, when a circuit is closed through said wires, the lamps will be energized.

Attached to the casing is an angle shaped supporting bracket therefor having an arm 28 which extends beneath the casing, and an angularly disposed arm 29 which upstands at the rear of the casing. Near its forward end, the arm 28 is provided with an opening 30 which accommodates the bolt 16 so that this bolt not only serves to clamp the top and bottom plates 13 and 14 upon the shell but also serves to rigidly connect the bracket with the casing. Formed in the arm 28 near its rear end is an opening 31 which registers with a like opening in the bottom plate 13 to accommodate the circuit wires 26 and 27 of the lamps, and formed in the arm 29 of the bracket is a longitudinally extending slot 32. This slot is adapted to freely receive a U-bolt 33, and apertured to freely fit over the ends of the bolt is a clamping plate 34, while the bolt is threaded at its end portions to receive nuts 35.

In Figure 1 of the drawings, I have shown my improved auxiliary headlight in connection with a conventional motor vehicle. The usual headlights of the vehicle are indicated at 36, and extending between said headlights is the customary cross bar 37. The auxiliary headlight is preferably mounted upon this bar midway between the headlights 36. As brought out in Figure 2, the arm 29 of the supporting bracket of the device is arranged to abut the cross bar 37 at its forward side while the U-bolt 33 is arranged to embrace the bar and is projected at its ends through the slot 32 of said arm. The plate 34 is then slipped over the ends of the bolt and the nuts 35 applied and tightened for rigidly clamping the device upon said bar. Thus, as will be appreciated, the auxiliary headlight may be readily applied and attention is now directed to the fact that in forming the arm 29 of the bracket with the slot 32, provision is made whereby the device may be adjusted vertically relative to the bar while, also, the U-bolt 33 may be turned on the bar for adjustably tilting the beams of the lamps 24 to strike the roadway either nearer to or further removed from the front of the vehicle, as may be desired. The circuit wires 26 and 27 are, of course, connected with the battery of the vehicle or other appropriate source of electrical energy thereon, and, preferably, a suitable switch is located in the circuit for controlling the energization of the lamps. Since the lamps occupy an angular position with respect to each other, the beam of one lamp will be directed toward one side of the roadway while the beam of the other lamp will be directed toward the other side of the roadway. The shoulders of the roadway will accordingly be illuminated and, as will be appreciated, the additional illumination furnished by the lamps will greatly assist the driver in turning corners or turning into residential entrances or the like.

Having thus described the invention, what I claim is:

1. A device of the character described including a shell, top and bottom plates closing the shell, a supporting bracket, means extending through said plates and the bracket and clamping said plates on the shell to form a casing as well as connecting said bracket with the casing, a reflector mounted within the casing, and a lamp mounted in said reflector.

2. A device of the character described including a substantially triangular-shaped casing having a back wall and angularly disposed front walls, a contact supported by the back wall, angularly disposed reflectors secured to said walls, and lamps mounted in said reflectors and engaging the ends of the contact.

3. A device of the character described including a casing having angularly disposed front walls and a back wall, an insulating block fixed to the back wall, a spring contact carried by said block, angularly disposed reflectors fixed to said front walls, and lamps mounted within said reflectors and engaging the ends of said contact.

4. A device of the character described including a casing having angularly disposed front walls and a back wall, an insulating block fixed to the back wall, a flat spring contact fixed to said block and projecting at its ends at opposite sides of the block, angularly disposed reflectors carried by said front walls, and lamps mounted in said reflectors and having terminals engaging the ends of said contacts, the lamps flexing the contact longitudinally whereby the contact is held under tension for maintaining tight engagement between the contact and said terminals as well as holding the lamps against rattling.

In testimony whereof I affix my signature.

HARVEY G. SMITH. [L. S.]